W. J. McMICHAEL.
NUT LOCK.
APPLICATION FILED FEB. 27, 1914.
1,185,115.
Patented May 30, 1916.
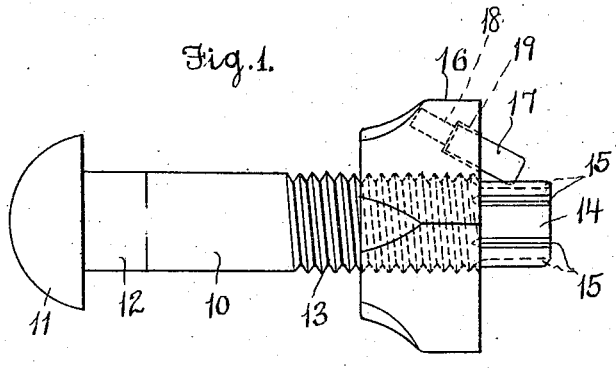
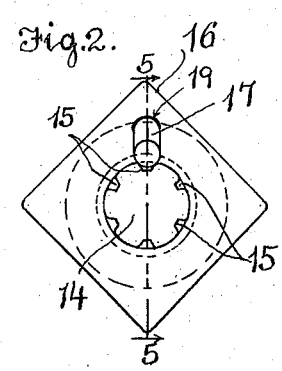
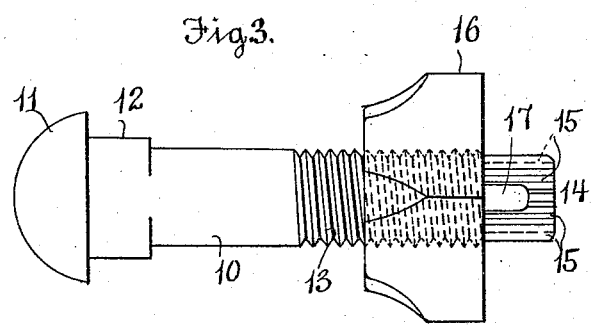
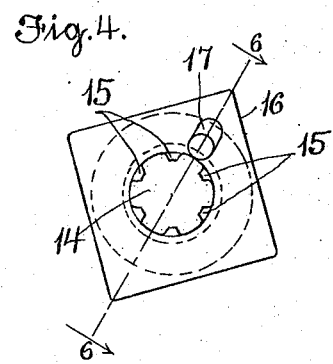
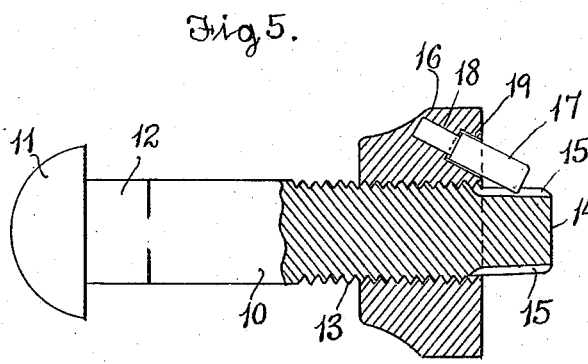
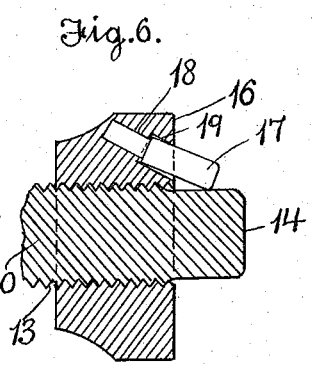

UNITED STATES PATENT OFFICE.

WILLIAM J. McMICHAEL, OF WOONSOCKET, RHODE ISLAND.

NUT-LOCK.

1,185,115.  Specification of Letters Patent.  Patented May 30, 1916.

Application filed February 27, 1914. Serial No. 821,435.

*To all whom it may concern:*

Be it known that I, WILLIAM J. MC-MICHAEL, a citizen of the United States, and resident of Woonsocket, in the county of Providence and State of Rhode Island, have invented certain new and useful Improvements in Nut-Locks, of which the following is a specification.

This invention has relation to nut locks, and has for its object to provide a lock that will prevent the nut from working loose notwithstanding the jarring and vibration to which it may be subjected.

In the accompanying drawings:—Figure 1 shows a side elevation of a bolt and nut embodying the invention. Fig. 2 represents an end elevation thereof. Fig. 3 represents a plan view of the same. Fig. 4 represents an end elevation and shows the locking pin riding over the cylindrical portion of the end of the bolt. Figs. 5 and 6 represent longitudinal sections on the lines 5—5 of Fig. 2 and 6—6 of Fig. 4.

In general the invention comprises a bolt and a nut having a spring pin extending at an inclination from its rear or outer face so that its end may engage the periphery of the bolt so as to lock the nut against accidental reverse rotation. The bolt 10 is shown as of the type employed for railroad rails and has the head 11, and the elliptical enlargement 12 adjacent the head by which the bolt is held against rotation. The shank is threaded at 13 as usual.

In the illustrated embodiment of the invention there is beyond the threaded portion a cylindrical end or extremity 14 provided with a series of depressions 15 formed in the periphery thereof.

The nut 16 may be of any usual conformation, and as shown it is square. It is provided with a pin 17 projecting from its outer or rear face toward and at an acute angle to the axis of the nut, and to the bolt when the nut and bolt are engaged. The socket for the pin is of two diameters, as at 18 and 19, the portion 19 being larger than the pin to permit lateral bending of the latter. The pin may have an unbroken periphery, or it may be shouldered as shown. Its inner end is driven tightly into the inner portion 18 of the socket. The pin is formed of hard springy material so that it will bend under pressure. Preferably when unflexed a portion of its end would lie in the path of the end of the bolt, so that when the nut is screwed on the bolt, the end of the pin is sprung outwardly so as to engage the cylindrical portion of the bolt with considerable spring pressure. In the form shown, when the pin reaches one of the depressions it springs into it and yieldingly locks the nut against reverse rotation. The depressions are so formed, that by a wrench or other like tool the nut may be rotated to engage the depressions progressively until the nut has reached its working position and can be no longer rotated. The shape of the pin in cross section is immaterial, as it can be round, square or triangular if desired. I secure a decided advantage by arranging the pin angularly with its projecting end converging toward the bolt, since I am able thereby to prevent the pin from working loose, the pressure of the bolt against the pin holding the latter firmly in the socket. The pin alone, or both the pin and the unthreaded end portion of the bolt, may be hardened. By providing the pin socket in the nut with an enlargement, I increase the flexibility of the pin, as will be readily understood.

Having thus explained the nature of my said invention and described a way of making and using the same, although without attempting to set forth all of the forms in which it may be made or all of the modes of its use, what I claim is:

1. The combination with a bolt having a series of peripheral depressions in its end portion, of a nut having a threaded aperture with open ends, and having an inclined socket in its rear face and a spring pin located in said socket and projecting from the rear face of said nut and lying at an acute angle to the axis of the nut and bolt, whereby it is held against accidental dislocation by its engagement with the bolt, said pin being adapted successively to engage said depressions.

2. The combination with a bolt having a threaded portion and having a series of depressions, of a nut threaded on the bolt and having an inclined socket in its outer face with an enlarged outer portion, and a spring locking pin inserted in said socket and arranged at an angle to the bolt so that its end will spring successively into said depressions when the nut is rotated.

3. The combination with a bolt, of a nut having a threaded aperture extending from face to face thereof, said nut having a socket in its rear face inclined to the central bore of the nut, and a spring pin set in said socket and normally projecting rearwardly or outwardly at an angle to the bolt so that its end will engage the periphery of the bolt and move helically thereabout as the nut is screwed in place on the bolt.

In testimony whereof I have affixed my signature, in presence of two witnesses.

WILLIAM J. McMICHAEL.

Witnesses:
JAMES McMICHAEL,
G. PELORI.

Copies of this patent may be obtained for five cents each, by addressing the "Commissioner of Patents Washington, D. C."